United States Patent
Koyama et al.

(10) Patent No.: US 7,044,005 B2
(45) Date of Patent: May 16, 2006

(54) ROTATION ANGLE SENSOR HAVING SINGLE WIRE WINDINGS AND METHOD FOR WINDING A ROTATION ANGLE SENSOR

(75) Inventors: Toshisada Koyama, Miyota-Machi (JP); Mutsumi Matsuura, Tokyo (JP); Takashi Sano, Tokyo (JP)

(73) Assignee: Minebea Co., Ltd., Nagano-ken (JP)

( * ) Notice: Subject to any disclaimer, the term of this patent is extended or adjusted under 35 U.S.C. 154(b) by 47 days.

(21) Appl. No.: 10/892,486

(22) Filed: Jul. 16, 2004

(65) Prior Publication Data

US 2005/0034541 A1 Feb. 17, 2005

(30) Foreign Application Priority Data

Jul. 17, 2003 (JP) ............... 2003-275952

(51) Int. Cl.
*G01L 3/14* (2006.01)
(52) U.S. Cl. .................. 73/862.333; 310/164; 336/131
(58) Field of Classification Search ........... 73/862.333, 73/862.336; 242/432; 310/71, 216, 254, 310/42, 49 R, 164; 324/207.2, 207.25; 336/130
See application file for complete search history.

(56) References Cited

U.S. PATENT DOCUMENTS

| | | | | |
|---|---|---|---|---|
| 5,691,583 A | * | 11/1997 | Suzuki et al. | 310/164 |
| 6,288,535 B1 | * | 9/2001 | Chass | 324/207.2 |
| 6,323,571 B1 | * | 11/2001 | Nakahara et al. | 310/71 |
| 6,891,460 B1 | * | 5/2005 | Tezuka et al. | 336/130 |
| 2003/0137208 A1 | * | 7/2003 | York et al. | 310/194 |

FOREIGN PATENT DOCUMENTS

JP A-10-170306 6/1998

* cited by examiner

*Primary Examiner*—Jewel V. Thompson
(74) *Attorney, Agent, or Firm*—Adduci, Mastriani & Schaumberg, L.L.P.

(57) ABSTRACT

A rotation angle sensor and a method of winding a rotation angle sensor involve a single electrical wire that is wound from a rotor transformer to a magnetic rotor. The magnetic rotor is axially spaced on a shaft from the rotor transformer. A notch is formed in a wall of a bobbin of the rotor transformer to permit the wire to pass from the rotor transformer to the magnetic rotor. The ends of the single wire are electrically connected together at a junction, and the junction is fixed to the rotor transformer with resin.

10 Claims, 4 Drawing Sheets

US 7,044,005 B2

ROTATION ANGLE SENSOR HAVING SINGLE WIRE WINDINGS AND METHOD FOR WINDING A ROTATION ANGLE SENSOR

CROSS REFERENCE TO RELATED APPLICATION

This application is based on and incorporates by reference Japanese Patent Application No. 2003-275952, which was filed on 17 Jul. 2003.

BACKGROUND OF THE INVENTION

The present invention relates to a rotation angle sensor that includes a brushless resolver having a transformer and a magnetic rotor and to a method for winding a rotation angle sensor, and in particular, to a rotation angle sensor in which a rotor transformer winding and a magnetic rotor winding are wound with a single wire.

A brushless resolver has a transformer winding such that, in addition to the rotor and stator for excitation and detection, the resolver includes a transformer for a power supply. FIG. 5 shows an example.

FIG. 5 is a cross-sectional view of the structure on the rotor of a conventional resolver. The structure of the stator is omitted. FIG. 5 shows the rotor structure including a rotor 102 having bobbin 103 integrally formed with the rotation shaft 101 (the rotor winding is not shown in the drawing). FIG. 5 represents an improvement over a conventional rotor transformer structure in which the bobbin 103 from is formed separately from the rotation shaft 101 and combined later. The rotor winding and rotor transformer winding are individually formed, and then combined. (e.g., see Japanese patent publication JP H10-170306). Then, the rotor winding and rotor transformer winding are connected, and the connection is performed as described below.

FIGS. 6A and 6B show a conventional connection of the rotor winding and rotor transformer winding. FIG. 6A shows that a rotor having a magnetic rotor winding and a rotor transformer having a rotor transformer winding are mounted on a rotation shaft. FIG. 6B shows a state in which the lead wires of each winding shown in FIG. 6A are connected.

The coil bobbin 113 of the rotor transformer 112 is mounted on a winding machine (not shown in the drawing), and an electrical wire is coiled around the groove of the coil bobbin 113 for a predetermined number of times. Then the lead wire 122a at the starting side of the winding and the lead wire 122b at the ending side of the winding are temporarily fixed with an insulation tape (not shown in the drawing). Then, the lead wires 122a, 122b are led out from the winding machine.

Regarding the magnetic rotor 114, a laminated rotor core 123 is mounted on the winding machine and the electric wire is coiled for a predetermined number of times on each of many magnetic poles of the rotor core 123. The wire may be coiled directly on each magnetic pole or indirectly via a coil bobbin. Then, the lead wire 124a at the start of the winding and the lead wire 124b at the end of the winding are temporarily fixed with insulation tape, and then led out from the winding machine.

Next, a hollow rotation shaft 111 is inserted and fitted in the magnetic rotor 114 and the rotor transformer 112. Then, as shown in FIG. 6A, the magnetic rotor 114 and the rotor transformer 112 are positioned at predetermined locations on the rotation shaft 111. At that time, the magnetic rotor 114 and the rotor transformer 112 are arranged so that an opening 119 of the coil bobbin 113 of the rotor transformer 112 is located on the side of the coil bobbin 113 that faces the magnetic rotor 114.

When the magnetic rotor 114 and the rotor transformer 112 are positioned properly, insulation tubes 128 are mounted on the lead wires 124a and 124b. Then, the starting lead wire 124a and the ending lead wire 124b of the magnetic rotor winding 121 are led into the groove of the coil bobbin 113 via the opening 119. Then, while taking the polarity of the magnetic rotor winding 121 and rotor transformer winding 120 into account, the lead wires 124a and 124b of the magnetic rotor winding 121 are connected to the starting lead wire 122a and ending lead wire 122b of the rotor transformer winding 120, so that a series circuit is formed. The insulation coating of the electric wire will not be damaged by the edge of the opening 119 due to the insulation tubes 128.

In the case of FIG. 6B, the ending lead wire 124b and the starting lead wire 122a are connected with solder 126. Similarly, the starting lead wire 124a and the ending lead wire 122b are connected with solder 127. The soldered connections are made along insulation tape 125, which is attached to the surface of the rotor transformer winding 120, and fixed with resin. This method has the following problems.

Conventionally, a semi-finished product has been manufactured for each unit. That is, a semi-finished rotor component, in which the magnetic rotor winding is coiled and its lead wire is temporary fixed with tape, and a semi-finished rotor transformer component, in which the rotor transformer winding is coiled and its lead wire is temporarily fixed with tape, are individually formed. Then, an alignment process in which the rotation shaft is inserted in the components is carried out. The alignment is difficult because the finished winding may be mistakenly deformed by being pressed manually or the temporary insulation tape may detach, and the predetermined shape of the coiled winding may be destroyed.

In addition, when the lead wires of the magnetic rotor winding and the lead wires of the rotor transformer are connected, the lead wires of the magnetic rotor winding are covered with insulation tubes 128 and then fed through the opening 119. Then, the lead wires 124a, 124b, 122a, 122b are connected at two junctions, and the two junctions are placed along the rotor transformer winding via insulation tape and fixed with resin. The process is difficult to carry out in a small space, and thus, long lead wires must be employed. Unlike the winding portion, the long lead wires may generate an irregular magnetic field that has an effect on the basic magnetic field, which is based on the designated number of windings, and may create an uneven weight distribution, which may cause oscillations during the rotation. Further, the long lead wires may cause a restriction such that the interval between the rotor transformer and magnetic rotor cannot be narrowed.

SUMMARY OF THE INVENTION

An objective of the invention is, by taking the above-mentioned problems into account, to provide a rotation angle sensor having a simple connection structure for the lead wires.

The present invention is mainly characterized in that, in order to reduce the number of connections between the lead wires of the magnetic rotor winding and rotor transformer to one, both windings are formed by a continuous coiling of a single electric wire. To allow the continuous coiling, a notch, through which the wire passes, is formed on the coil bobbin of the rotor transformer.

The invention is basically a rotation angle sensor characterized in that a coil bobbin of a rotor transformer, which has a notch on its side wall, and a laminated core of a magnetic rotor are arranged parallel to one another on a rotation shaft. A rotor transformer winding and a magnetic rotor winding, in which a single electric wire is continuously coiled on the coil bobbin of the rotor transformer and the laminated core of the magnetic rotor via the notch, are formed. The ends of the electric wire are connected via the notch and are fixed on the rotor transformer winding with resin.

The laminated core of the magnetic rotor has a plurality of magnetic poles, and the electric wire is continuously coiled on each magnetic pole.

In another aspect of the invention, the coil bobbin of the rotor transformer has annular grooves, and the grooves are arranged to accommodate the rotor transformer windings.

In another aspect of the invention, edges of the walls that define the notch are coated with a resin to provide the edges with a low friction surface. The resin is one that provides low friction contact. Thus, the wire will not be damaged by contact with the edges of the walls that define the notch Therefore, in one aspect of the invention, the rotation angle sensor includes a coil bobbin of a rotor transformer, which has a notch on the side wall, and a laminated magnetic rotor core. The coil bobbin and the laminated core are located in a parallel relationship on a rotation shaft. A single electric wire is continuously coiled on the coil bobbin to form a rotor transformer. The same wire is continuously coiled on the laminated core to form a magnetic rotor winding. The wire passes from the rotary transformer to the magnetic rotor through the notch. First and second ends of the winding of the electric wire are connected through the notch and fixed on the rotor transformer winding with resin. Therefore, the rotor transformer winding and magnetic rotor winding are formed by a continuous winding of a single electric wire. In addition, only one connection is needed at only one location, allowing the length of electric wire to be shortened at only one place. Consequently, the electric effect and magnetic effect on the winding at the connection can be reduced compared to the prior art.

The laminated core of the magnetic rotor has magnetic poles, and in principle, only the projected magnetic poles are coiled, allowing machine winding. In addition, for the magnetic rotor winding, when all the magnetic poles are coiled, the end of the winding is directed back to the beginning of the winding, which allows continuous coiling with a single electric wire.

The coil bobbin of the rotor transformer has annular grooves, which extend at a right angle to the axis of the rotation shaft, and therefore, the rotor transformer winding which is a continuously coiled single electric wire, can be arranged in the grooves.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1A:
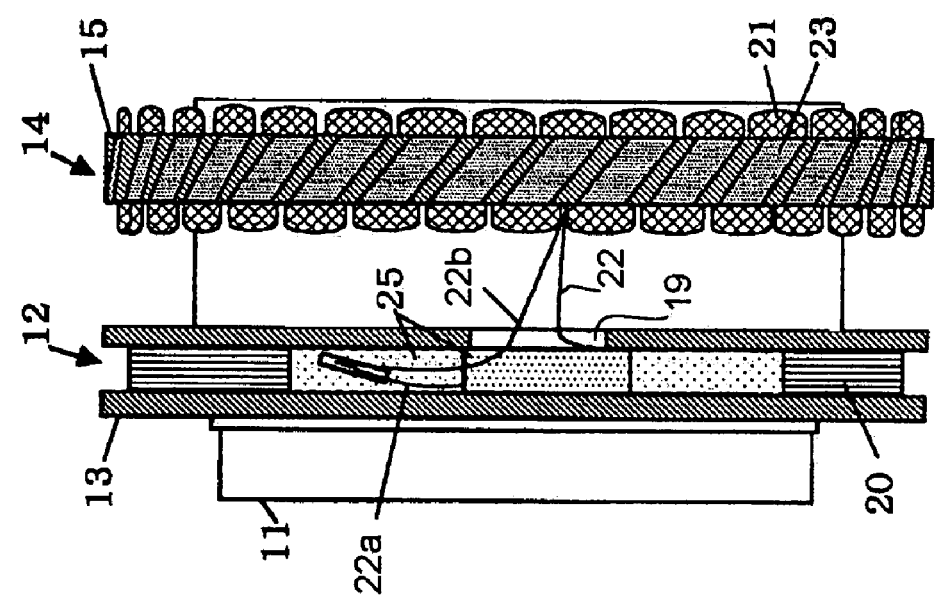
FIG. 1A is a diagrammatic side view illustrating an initial stage of the winding process of the magnetic rotor and rotor transformer of the rotation angle sensor of the present invention.
Figure 1B:
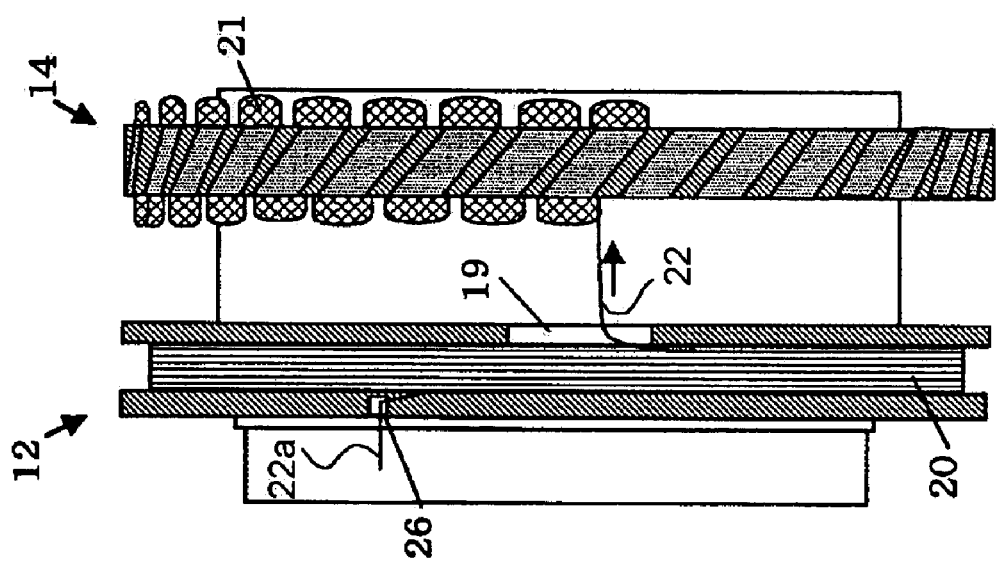
FIG. 1B is a diagrammatic side view illustrating an intermediate stage of the winding process of the magnetic rotor and rotor transformer of the rotation angle sensor of the present invention.
Figure 1C:
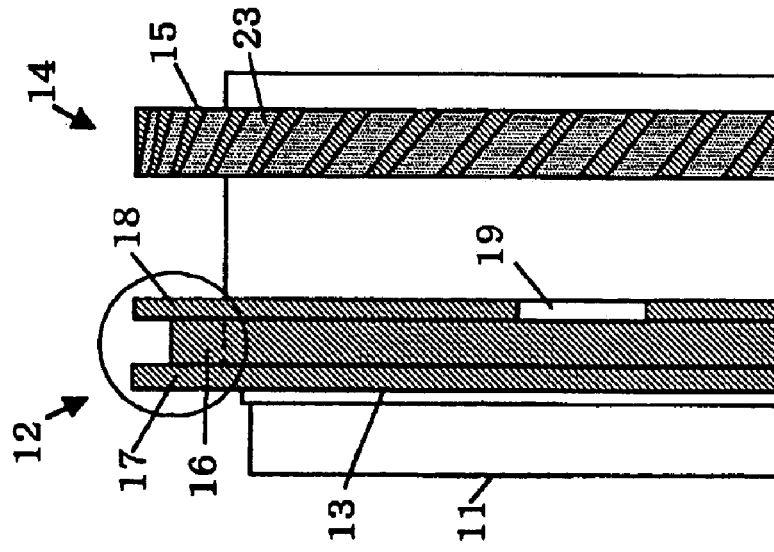
FIG. 1C is a diagrammatic side view illustrating a late stage of the winding process of the magnetic rotor and rotor transformer of the rotation angle sensor of the present invention.

FIG. 1 shows an initial stage of the winding process for a magnetic rotor 14 and a rotor transformer 12 of a rotation angle sensor of the present invention. FIG. 1A shows a laminated core 15 of the magnetic rotor 14 and a coil bobbin 13 of the rotor transformer 12 prior to initiation of coiling. FIG. 1B shows the laminated core 15 of the magnetic rotor 14 and the coil bobbin 13 of the rotor transformer 12 during the coiling process, and FIG. 1C shows the laminated core 15 of the magnetic rotor 14 and the coil bobbin 13 of the rotor transformer 12 after the coiling is completed. The rotation angle sensor includes a stator (not shown) and the magnetic rotor 14 for excitation and detection. In addition, the rotation angle sensor includes a stator transformer (not shown) and the rotor transformer 12 for the electric supply.

First, as shown in FIG. 1A, the coil bobbin 13 of the rotor transformer 12 and the laminated core 15 of the magnetic rotor 14 are fitted to a hollow rotation shaft 11, which is made of a metal such as an aluminum alloy. Then the coil bobbin 13 and the laminated core 15 are positioned and fixed. The coil bobbin 13 is made of a magnetic substance, an aluminum alloy, or the like. Alternatively, the coil bobbin 13 of the rotor transformer 12 can be formed on the hollow rotation shaft 11 in advance.

The coil bobbin 13 of the rotor transformer 12 is arranged annularly on the surface of the rotation shaft 11 and its rim has a cross-sectional shape that resembles a squared U-shape.

Figure 4:
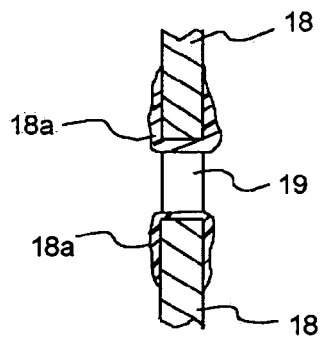
FIG. 4 is a partial cross sectional view of a side wall of the bobbin showing a resin coating on the notch.
Figure 5:
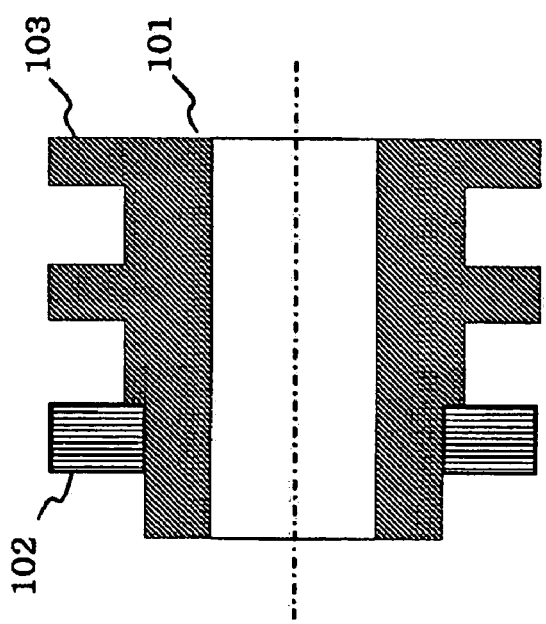
FIG. 5 is a cross-sectional view of a rotor of a conventional resolver.
Figure 6A:
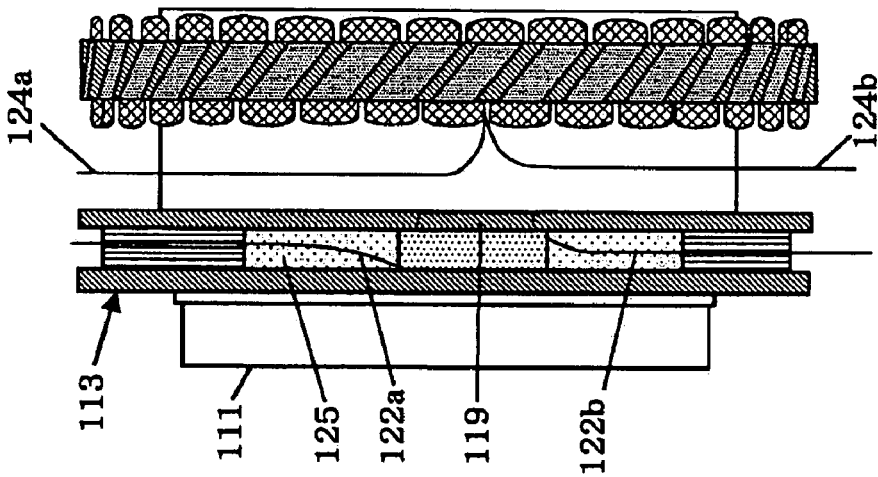
FIG. 6A is a diagrammatic side view illustrating an initial stage of a method of connecting lead wires of a magnetic rotor winding and a rotor transformer winding of a conventional resolver.
Figure 6B:
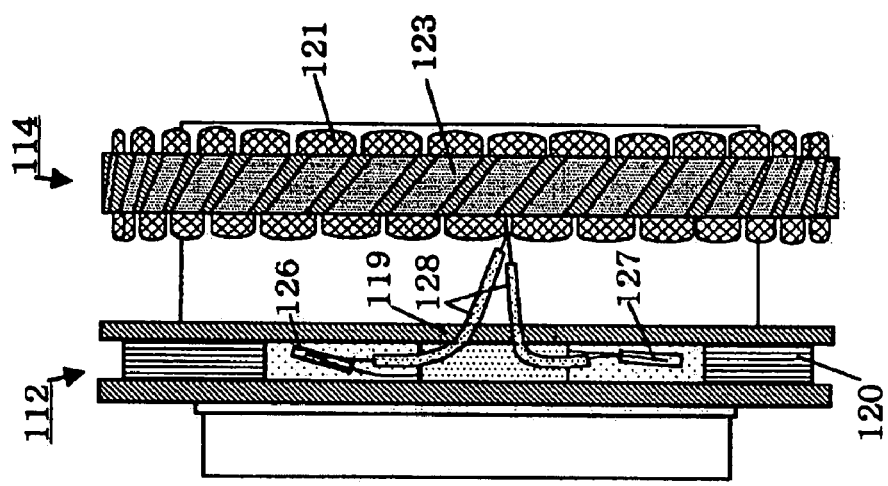
FIG. 6B is a diagrammatic side view illustrating a later stage of a method of connecting lead wires of a magnetic rotor winding and a rotor transformer winding of a conventional resolver.

The U shape is, as shown in the circled window of FIG. 1A, a bottom 16 and side walls 17 and 18. On one side wall 18, a notch 19 is formed to accommodate an electric wire (magnet wire). Preferably, the edges of the notch 19 are rounded or coated a resin 18a with a small contact resistance, for example, Teflon (trademark), to prevent damage to the insulation coating of the electric wire (See FIG. 4). The notch 19 is shaped such that the magnetic flux generated due to the electric current flow in the rotor transformer winding 20 practically has no effect on a magnetic rotor winding 21. When the coil bobbin 13 is formed by a magnetic substance, it forms a magnetic path and functions as an electromagnetic shield.

The laminated core 15 is, in the case of the embodiment of FIG. 1A, laminated with a predetermined number of silicon steel plates and fixed. The steel plates are punched in a shape that includes salient poles, or magnetic poles, and then fixed, and an insulator that also serves as a coil bobbin is mounted as required. The magnetic poles of the plates that form the laminated core 15 are skewed as shown. That is, the plates that form the laminated core 15 are slightly offset from one another to form the skewed poles as shown in FIG. 1A.

Next, the rotation shaft 11, in which the positioning of the coil bobbin 13 of the rotor transformer 12 and the laminated core 15 of the magnetic rotor 14 is completed, is fixed on a winding machine (not shown in the drawing) and then, through a process using a multi-joint robot (not shown in the drawing) a first end 22a of an electric wire 22 is temporarily fixed to the coil bobbin 13 of the rotor transformer 12 with insulation tape 26. Then, with the multi-joint robot, the rotor transformer 12 is continuously coiled with the same piece of electric wire 22. Then the same piece of wire 22 is coiled for a predetermined number of times and fed through the notch 19 of the bobbin 13. Then, the same piece of wire 22 is coiled on the rotor transformer 12 and then on each of the magnetic poles 23 of the laminated core 15 of the magnetic rotor 14 in one direction for a predetermined number of times.

When all the magnetic poles 23 are coiled, a second end 22b of the electric wire 22 of the magnetic rotor winding 21 is arranged in the coil bobbin 13 through the notch 19 of the coil bobbin 13. Insulation tape 25 is attached on the rotor transformer winding 20 so that the winding will not come off and so that solder from the next process will not fall on the electric wire and break it.

The first and second ends 22a, 22b of the wire 22 are soldered together and arranged along the insulation tape 25. Then, the solder joint is sealed with resin. The resin-sealed portion is arranged along the insulation tape, and then fixed with resin.

The winding direction of the rotor transformer winding 20 and the winding direction of the magnetic rotor winding 21 are significantly different; they are essentially transverse to one another. Therefore for the winding machine, for example, a vertical multiple-joint robot 31 is used. Multiple-joint robots are commercially available from a variety of companies and, in the present invention, the robot 31 can be appropriately selected from those available based on the circumstances.

Figure 2:
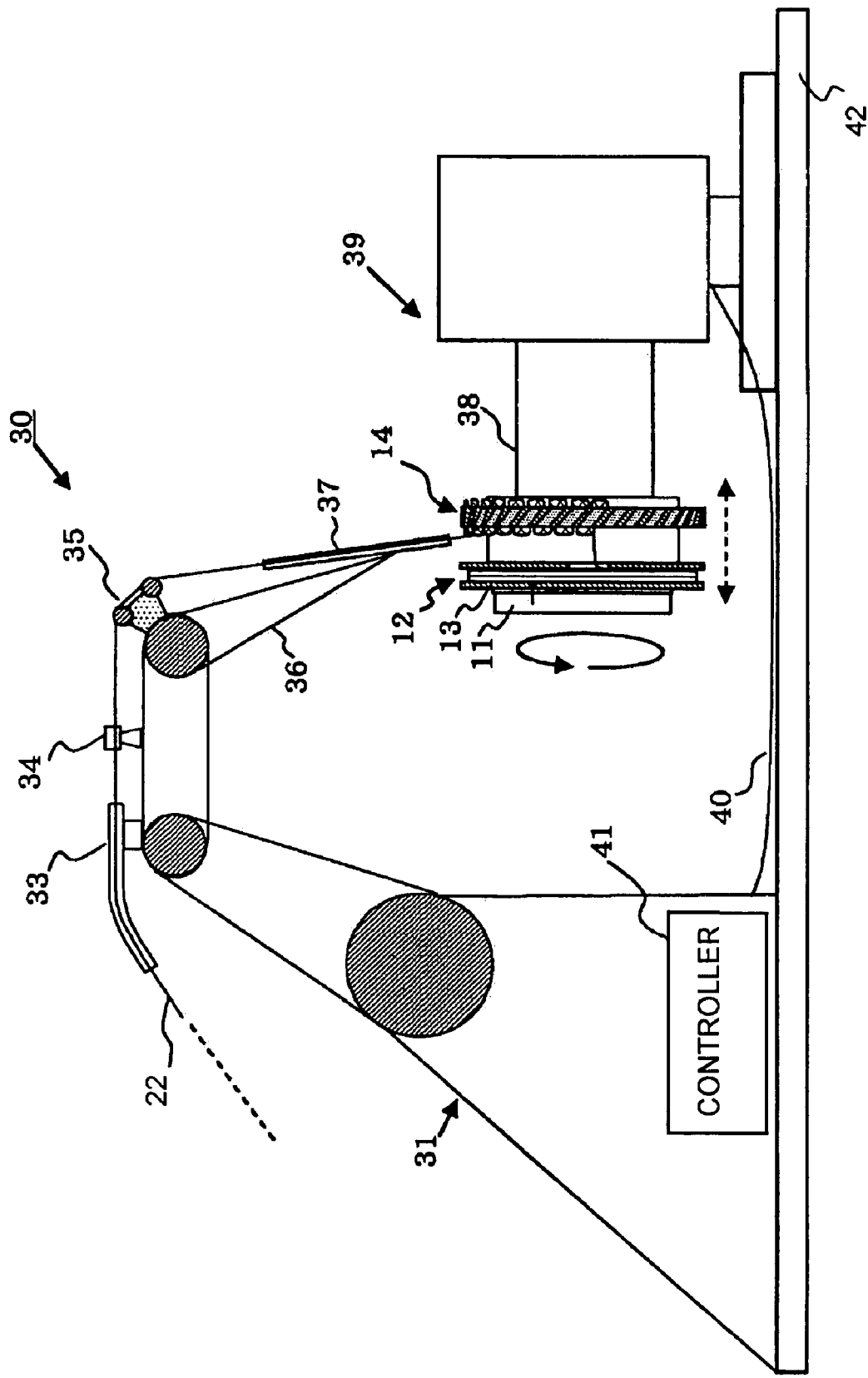
FIG. 2 is diagrammatic side view of a winding machine that uses the multi-joint robot of the present invention.

FIG. 2 shows a winding machine 30 that uses the multi-joint robot 31. In FIG. 2, the winding machine 30 includes the multi-joint robot 31 and a work holder 39 that are arranged on a platform 42. The position of the multi-joint robot 31 and work holder 39 can be changed on the platform 42.

The multi-joint robot 31 of FIG. 2 has only three axes, however, the number of axes is determined in connection with the operation of the work holder 39 and a movable tip 36. Often, a multi-joint robot with 6 axes is employed. The electric wire 32 is led to a nozzle 37, which is arranged on the movable tip 36 of the multi-joint robot 31 through electric wire guides 33, 34 and 35, which are provided on the multi-joint robot 31. The nozzle 37 can be either fixed or movable on the movable tip 36. When the nozzle 37 is movable, the nozzle 37 is structured so that the installation angle of the nozzle 37 against the movable tip 36 is changed to carry out a regular winding, and it carries out the designated winding operation with an integrated motor (not shown in the drawing).

The work holder 39 has a control circuit and a driving source such as a motor that moves a chuck 38 rotationally and axially.

The multi-joint robot 31 and work holder 39 are connected with a cable 40, and the required control is carried out by a controller 41. The controller 41 includes a microcomputer that executes a program. The program includes a winding process routine. The winding process routine has a learning routine that includes a learning routine for the movable tip 36, and in particular, it has a learning routine for the winding process of the magnetic poles of the laminated core 15 of the magnetic rotor 14.

In the winding process, the rotation shaft 11, on which are the coil bobbin 13 of the rotor transformer 12 and the laminated core 15, is held by the chuck 38 of the work holder 39 as shown in FIG. 2.

On a rear side of the multi-joint robot 31, an electric wire reel (not shown in the drawing) is provided, and the electric wire 22 sent out from the reel passes through the wire guides 33, 34 and 35 of the multi-joint robot 31. Then, the wire 22 is led to the nozzle 37, as shown. The electric wire 22 is supplied from the nozzle 37 via a tension setting mechanism (not shown in the drawing) so that the wire 22 has a constant tension.

By programmatically controlling the nozzle 37 while the chuck 38 of the work holder 39 is rotation controlled so that the tension of the electric wire 32 is constant, the electric wire 22 is coiled around the coil bobbin 13. Once the number of windings for the coil bobbin reaches a predetermined number, the multi-joint robot 31 directs the wire 22 to the magnetic rotor 14 through the notch 19. Then, the multi-joint robot 31 continuously coils the magnetic poles of the magnetic rotor 14 using the same single electric wire 22. Note that the wire 22 passes through the notch 19 directly to one of the nearest poles of the magnetic rotor 14 so that the insulation coating of the wire 22 is not damaged by contact with the edges of the notch 19.

The magnetic poles are coiled by moving the nozzle 37 around the magnetic poles of the laminated core 15 of the magnetic rotor 14. The electric wire 22 sent out from the nozzle 37 is coiled from the base end (inner end) of each salient pole to the distal end, or from the distal end to the base end in a single line, and then it is coiled in a plurality of layers.

When the nozzle 37 passes through the slot between the magnetic poles, it moves in a slanted state and is inclined outwards from the salient poles, so that the nozzle 37 can coil without contacting the distal ends of the magnetic poles.

By moving the nozzle 37 around each magnetic pole using the multi-joint robot 31, the angle and moving speed of the nozzle 37 can be freely adjusted depending on the rounding position. Therefore, damage to the insulation coating of the electric wire 32 is prevented, which allows multiple-layer coiling of the electric wire 32. When the winding of the laminated core of the magnetic rotor 14 is completed, the wire 22 is lead through the notch 19 to the coil bobbin 13, and then the winding process by the multiple-joint robot 31 is completed.

Once the winding is completed, both ends 22a, 22b of the single electric wire 22 are soldered in the coil bobbin 13 in the rotor transformer 12, and then fixed with resin.

With regard to the winding of the multi-joint robot, continuous coiling of a single electric wire for the magnetic rotor winding and the rotor transformer winding with different winding directions is accomplished. In addition, it is possible to coil 3 or more windings in different directions, and they are similarly carried out.

In addition, if a flyer is used instead of a multi-joint robot, the function of the work holder should be enhanced and, at a minimum, the winding direction is matched to the direction of the operation.

FIGS. 3A, 3B, 3C and 3D show an alternative embodiment in which shield plates 51, 52 provide electromagnetic shielding.

Figure 3A:
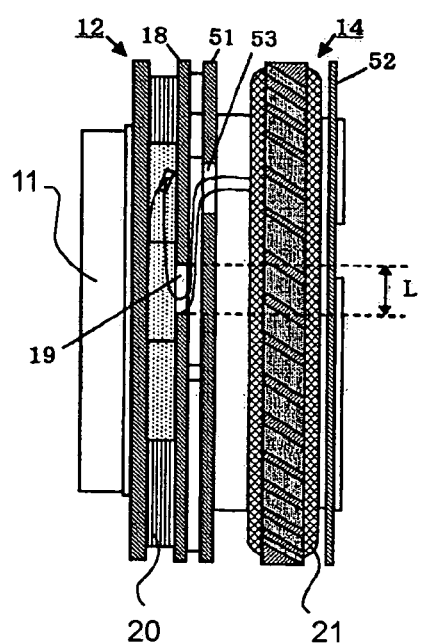
FIG. 3A is a diagrammatic side view of a further embodiment of the invention in which shield plates are fixed adjacent to the rotor transformer and the magnetic rotor.
Figure 3B:
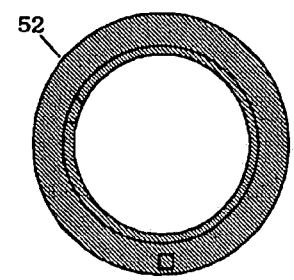
FIG. 3B is an end view of a shield plate 52.
Figure 3D:
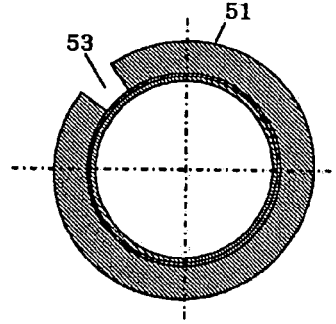
FIG. 3D is an end view of a shield plate 51.
Figure 3C:
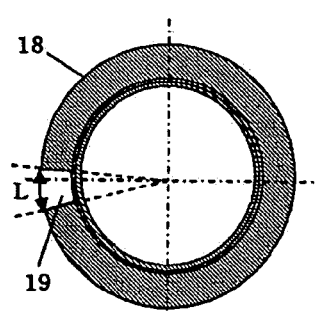
FIG. 3C is an end view of a sidewall 18 of a rotor transformer 12.

FIG. 3A shows an embodiment like that of FIG. 2 in which a rotor transformer winding and magnetic rotor winding are made with a single electric wire in a predetermined form, and the ends are soldered and fixed with resin. In this embodiment, a first shield plate 51 is provided on the rotation shaft 11 between the rotor transformer 12 and magnetic rotor 14, and a second shield plate 52 is provided on a side of the magnetic rotor 14 that is opposite to the shield plate 51. Thus, the magnetic rotor 14 is located between the first and second shield plates 51, 52.

Using the first shield plate 51 and the second shield plate 52, the effect of the magnetic field of the rotor transformer 12 on the magnetic rotor 14 and the effect of an external magnetic field and external noise can be practically nullified. Note that the first shield plate 51 includes a notch 53 to permit passage of the wire 22. The position of the notch 19 of the sidewall 18 of the bobbin 13 and the notch 53 of the first shield plate are selected so that the effect of the magnetic field and noise will not be increased.

The notches 19, 53 are located so that they do not overlap in the axial direction. That is, the angular position and length L of the notch 19 is chosen so that the notch 19 does not align in the axial direction with the notch 53. Accordingly, there is no magnetic flux passing through both of the notches 19, 53.

The distance of the first shield plate 51 from the rotor transformer winding 20 and the magnetic rotor winding 21 is, in principle, determined according to electric characteristics such as the SN ratio of the magnetic rotor winding. In addition, the distance is determined by the precision of the winding machine. In FIG. 3, two shield plates 51, 52 are provided. However, the number can be increased or decreased as required. The positions of the notches of the shield plates shall be set as described above.

Even when providing a shield plate, there is a single electric wire winding so that there is a single process for the electric wire. Therefore the structure is simple, manufacturing is easy and the electrical properties are improved.

What is claimed is:

1. A rotation angle sensor comprising:
  a shaft;
  a rotor transformer located on the shaft, which includes a coil bobbin, wherein a notch is formed in a side wall of the coil bobbin;
  a magnetic rotor located on the rotation shaft, wherein the magnetic rotor is axially spaced from the rotor transformer;
  a continuous electric wire, which forms a rotor transformer winding and a magnetic rotor winding, wherein the continuous electric wire is continuously coiled on the coil bobbin of the rotor transformer to form a rotor transformer winding, and the electric wire is continuously coiled on the magnetic rotor to form a magnetic rotor winding, and the wire passes from the rotor transformer to the magnetic rotor through the notch, and a first end and a second end of the wire are electrically connected together.

2. The rotation angle sensor of claim 1, wherein the magnetic rotor includes a core, which is a lamination of metal plates.

3. The rotation angle sensor of claim 1, wherein the second end of the electric wire passes from the magnetic rotor to the rotor transformer and is electrically connected to the first end of the electric wire, and the first and second ends of the electric wire are fixed to the rotor transformer winding with resin.

4. The rotation angle sensor of claim 3, wherein the magnetic rotor includes a core, which is a lamination of metal plates.

5. The rotation angle sensor of claim 2 wherein the laminated core of the magnetic rotor includes a plurality of projections, which form magnetic poles, and the wire is coiled around each of the projections.

6. The rotation angle sensor of claim 1, wherein the coil bobbin of the rotor transformer has ring-shaped grooves extending at a right angle to the rotation shaft, and the electric wire is continuously coiled in the grooves.

7. The rotation angle sensor of claim 1, wherein a wall that defines the notch is coated with resin to reduce friction between the wall defining the notch and the electric wire.

8. A method of winding an electric wire on a rotor transformer and a magnetic rotor of a rotation angle sensor, wherein the rotor transformer and the magnetic rotor are axially spaced apart on a shaft, wherein the method comprises:
  winding a single electric wire around the rotor transformer;
  feeding the electric wire through a notch formed in a side wall of a bobbin on the rotary transformer;
  winding the wire around a plurality of projections of the magnetic rotor; and
  electrically connecting a second end of the wire to a first end of the wire.

9. The method of claim 8 including passing the wire from the magnetic rotor to the rotary transformer through the notch after winding the wire around the projections of the magnetic rotor and before connecting the first end to the second end.

10. The method of claim 8, wherein the method further includes attaching a junction at which the first end and the second end are connected to the rotor transformer with resin.

* * * * *